(12) United States Patent
Hwang et al.

(10) Patent No.: US 8,135,349 B2
(45) Date of Patent: Mar. 13, 2012

(54) APPARATUS AND METHOD FOR INTERFERENCE CANCELLATION IN MULTI-ANTENNA SYSTEM

(75) Inventors: In-Soo Hwang, Yongin-si (KR);
Jong-Hyung Kwun, Seongsam-si (KR);
Jeff Andrews, Austin, TX (US);
Jin-Sam Kwak, Austin, TX (US);
Seijoon Shim, Seoul (KR); Robert Heath, Jr., Austin, TX (US)

(73) Assignees: Samsung Electronics Co., Ltd., Suwon-si (KR); Board of Regents, The University of Texas System, Austin, TX (US)

( * ) Notice: Subject to any disclaimer, the term of this patent is extended or adjusted under 35 U.S.C. 154(b) by 950 days.

(21) Appl. No.: 12/048,752

(22) Filed: Mar. 14, 2008

(65) Prior Publication Data

US 2008/0227422 A1    Sep. 18, 2008

(30) Foreign Application Priority Data

Mar. 14, 2007  (KR) .................. 10-2007-0025219

(51) Int. Cl.
*H04B 1/00*       (2006.01)
*H04B 15/00*     (2006.01)
(52) U.S. Cl. ...................... 455/63.1; 455/278.1; 375/267
(58) Field of Classification Search ................. 455/63.1, 455/278.1; 375/267
See application file for complete search history.

(56) References Cited

U.S. PATENT DOCUMENTS

| 7,248,841 B2* | 7/2007 | Agee et al. ..................... 455/101 |
| 7,751,780 B2* | 7/2010 | Saidi et al. ................. 455/67.11 |
| 2005/0039024 A1 | 2/2005 | Stemm et al. |
| 2007/0071127 A1* | 3/2007 | Gore et al. ..................... 375/267 |

FOREIGN PATENT DOCUMENTS

KR    10-2005-0020576 A    3/2005

OTHER PUBLICATIONS

Tolli et al., Suppression of Non-reciprocal Interference in Adaptive MIMO-OFDM Cellular System, Proc. IEEE 61st Vehicular Technology Conference, Jun. 2005, pp. 1,072-1,076.
Antti Tolli et al., Suppression of Non-reciprocal Interference in Adaptive MIMO-OFDM Cellular Systems, IEEE, 2005.

* cited by examiner

*Primary Examiner* — Tuan H Nguyen
(74) *Attorney, Agent, or Firm* — Jefferson IP Law, LLP

(57) ABSTRACT

An apparatus and method for interference cancellation in a multi-antenna system are provided. A transmission apparatus includes a channel identifier, a scheduler, an interference canceller, and a transmitter. The channel identifier identifies channel information of each of a plurality of receiving ends located in a service area and neighbor cell interference information on each receiving end. The scheduler selects at least one receiving end. The interference canceller precodes transmitted signals in order to cancel interference between receiving ends located in the same cell and neighbor cell interference. The transmitter transmits the precoded transmitted signals to the selected at least one receiving end.

6 Claims, 10 Drawing Sheets

APPARATUS AND METHOD FOR INTERFERENCE CANCELLATION IN MULTI-ANTENNA SYSTEM

PRIORITY

This application claims the benefit under 35 U.S.C. §119 (a) of a Korean patent application filed in the Korean Intellectual Property Office on Mar. 14, 2007 and assigned Serial No. 2007-25219, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co. Ltd. and the Board of Regents of The University of Texas System.

BACKGROUND OF THE INVENTION

1. Field of the Invention

The present invention relates to an apparatus and method for interference cancellation in a multi-antenna system. More particularly, the present invention relates to an apparatus and method for canceling interference between multiple users and for suppressing interfering signals from neighboring cells in a multi-antenna system of a multi-cell multi-user environment.

2. Description of the Related Art

With the rapid growth of wireless mobile communication markets, demand for a variety of multimedia services has been dramatically increasing. Thus, progress is being made in the providing of a large capacity of communication systems and the transmission of data at a high speed in order to provide such large-sized multimedia services. Also, recent information theoretical researched on a multi-antenna system has shown that a Multiple Input Multiple Output (MIMO) system enables to efficiently use a limited frequency.

Compared to a single-antenna system, a multi-antenna system can provide greater transmission reliability and a higher transmission rate without additional usage of frequency resource or transmission power by transmitting data over each antenna.

The multi-user multi-antenna system can also provide a greater spectral efficiency by allowing multiple users to simultaneously share spatial resources secured through the multiple antennas.

In a multi-user multi-antenna system, a transmitting end precodes and transmits a signal to each user in order to avoid generating interference between the users. For example, the transmitting end may employ a linear scheme such as a Zero Forcing (ZF) technique, a Minimum Mean Square Error (MMSE) technique, or a Block Diagonalization (BD) technique in order to reduce interference between multiple users. For another example, the transmitting end can employ a Dirty Paper Coding (DPC) technique or a Tomlinson Harashima precoding scheme to satisfy a system channel capacity while reducing signal interference between multiple users.

As mentioned above, the transmitting end precodes a signal to cancel interference between users located in the same cell, and transmits the signal to target users. Accordingly, from the transmitting end, the users receive a signal from which interference between the users located in the same cell has been canceled. The signal received by the users can be expressed by Equation 1 below:

$$y_k = H_k M_k s_k + H_k \sum_{l=1, l \neq k}^{K} M_l s_l + H_{I,k} x_{I,k} + n_k \quad (1)$$

$$= H_k x_k + H_k \sum_{l=1, l \neq k}^{K} x_l + z_k$$

In equation 1, $y_k$ denotes a signal received by a $k^{th}$ user, $H_k$ denotes a channel between a transmitting end and the $k^{th}$ user, $M_k$ denotes a precode for canceling interference between users within the same cell in the transmitting end, $s_k$ denotes a signal transmitted by the transmitting end, and $x_k$ denotes a signal precoded and transmitted by the transmitting end. $M_l$ denotes a precode for other users within the same cell, $s_l$ denotes a signal transmitted to other users from the transmitting end, and $x_l$ denotes a signal precoded and transmitted by the transmitting end. $H_{I,k}$ denotes channels of neighbor cells, $x_{I,k}$ denotes interference signals of the neighbor cells, and $n_k$ denotes a white noise of the $k^{th}$ user. Here, $z_k$ represents $H_{I,k} x_{I,k} + n_k$.

As in Equation 1, the transmitting end of the multi-antenna system can precode a transmitted signal and reduce interference between users within the same cell.

However, there is a problem of increased interference from adjacent cells that degrade a throughput performance of communication system even though the transmitting end performs precoding to reduce interference between users within the same cell.

SUMMARY OF THE INVENTION

An aspect of the present invention is to address at least the above-mentioned problems and/or disadvantages and to provide at least the advantages described below. Accordingly, an aspect of the present invention is to provide an apparatus and method for suppressing neighbor cell interference in a multi-antenna system of a multi-cell multi-user environment.

Another aspect of the present invention is to provide an apparatus and method for performing precoding in consideration of neighbor cell interference in a transmitting end of a multi-antenna system of a multi-cell multi-user environment.

A further aspect of the present invention is to provide an apparatus and method for feeding back channel information and neighbor cell interference information of a transmitting end to the transmitting end in a receiving end of a multi-antenna system of a multi-cell multi-user environment.

The above aspects are addressed by providing an apparatus and method for interference cancellation in a multi-antenna system.

According to one aspect of the present invention, a transmission apparatus in a multi-antenna system is provided. The apparatus includes a channel identifier, a scheduler, an interference canceller, and a transmitter. The channel identifier at the transmitting end identifies channel state information of receiving ends located in a service area and neighboring-cell interference information on each receiving end. The scheduler selects at least one receiving end from the plurality of receiving ends using the channel information of the receiving ends. The interference canceller precodes transmitting signals using the channel state information and the neighbor-cell interference information. The transmitter transmits the precoded transmission signals to receiving ends via downlink broadcast channel.

According to another aspect of the present invention, a receiving apparatus in a multi-antenna system is provided. The apparatus includes a receiver, a channel estimator, and a feedback controller. The receiver receives a signal using at least one antenna. The channel estimator estimates effective channel state information and neighbor-cell interference information that can be observed at each receiving end using pilot signals. The feedback controller feeds back the effective channel state information and neighbor-cell interference information to the transmitting end via a uplink feedback channel.

According to a further aspect of the present invention, a method for canceling interference in a multi-antenna system is provided. The method includes identifying channel state information of receiving ends located in a service area and neighbor-cell interference information on each receiving end, selecting at least one receiving end from the plurality of receiving ends using the channel state information of the receiving ends, preceding transmission signals using channel state information and neighbor-cell interference information to cancel multi-user interference among receiving ends located in the same cell and neighbor cell interference, and transmitting the precoded transmission signals to the selected at least one receiving end.

According still another aspect of the present invention, a method for canceling interference in a receiving apparatus of a multi-antenna system is provided. The method includes estimating effective channel state information and neighbor-cell interference information that can be observed at each receiving end by using pilot signals received through at least one antenna and feeding back the effective channel information and neighbor-cell interference information to the transmitting end via uplink feedback channels.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings in which.

Throughout the drawings, it should be noted that like reference numbers are used to depict the same or similar elements, features and structures.

DETAILED DESCRIPTION OF EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A technology for reducing neighbor cell interference in a multi-antenna system of a multi-cell multi-user environment according to an exemplary embodiment of the present invention is described below.

Figure 1:
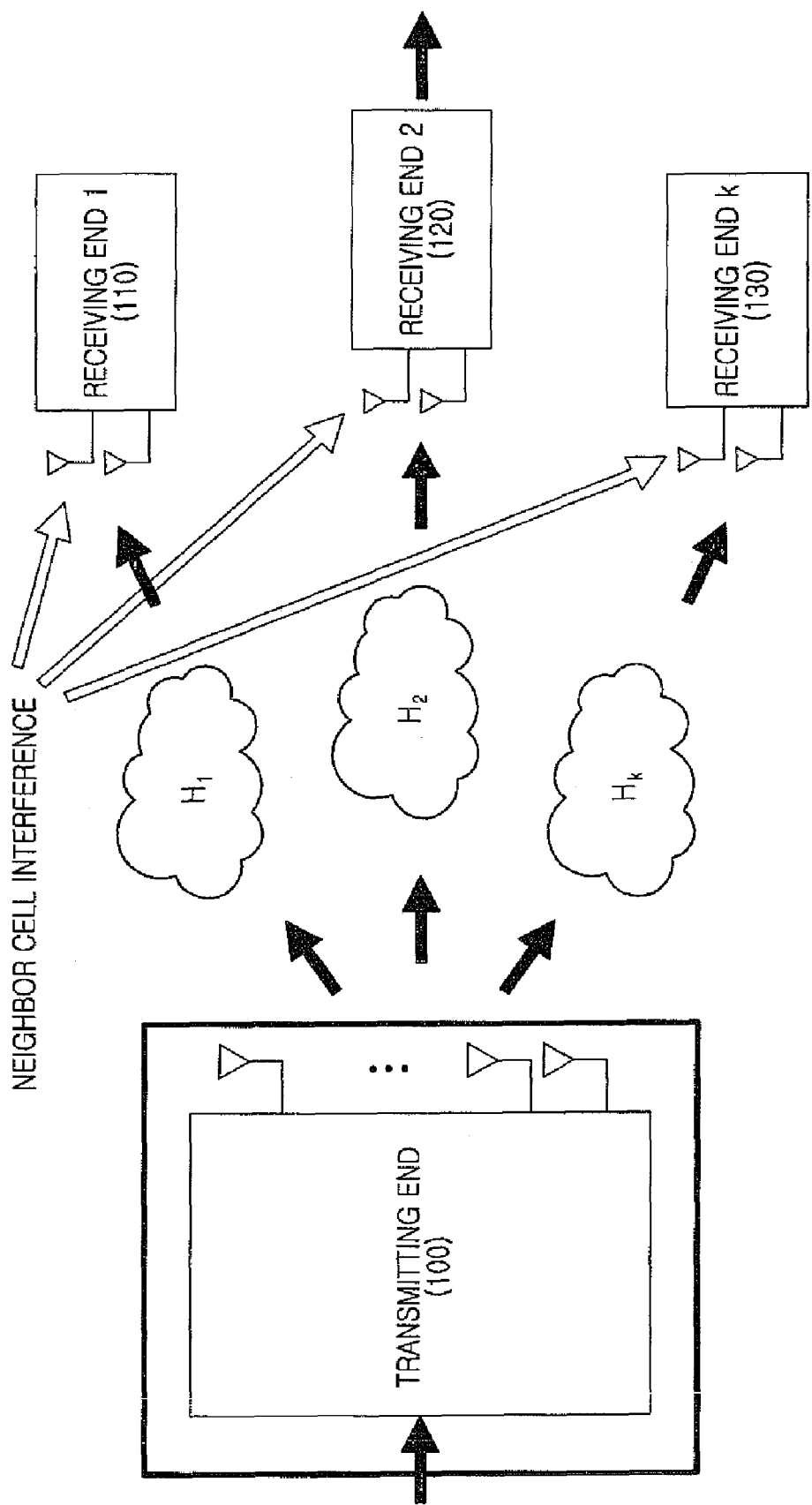
FIG. 1 is a diagram illustrating a construction of a multi-antenna system of a multi-user environment according to an exemplary embodiment of the present invention.

An exemplary multi-antenna system has a construction as illustrated in FIG. 1 below wherein receiving ends represent Mobile Stations (MSs) of users.

FIG. 1 is a diagram illustrating a construction of a multi-antenna system of a multi-user environment according to an exemplary embodiment of the present invention.

As illustrated in FIG. 1, a multi-antenna system includes a transmitting end 100 having a plurality of antennas ($N_T$-number) and a plurality of receiving ends 110, 120, and 130 each having a plurality of antennas ($N_R$ number).

The transmitting end 100 receives feedback information from the receiving ends 110, 120 and 130, which are located in a service area, and acquires downlink channel information for the receiving ends 110, 120, and 130 from the received feedback information.

In order to reduce neighbor cell interference, each of the receiving ends 110, 120, and 130 receive a signal expressed by Equation 2 below using a whitening filter.

$$r_k = W_k H_k x_k + W_k H_k \sum_{l=1, l \neq k}^{K} x_l + W_k z_k \qquad (2)$$

$$= H_{r,k} x_k + H_{r,k} \sum_{l=1, l \neq k}^{K} x_l + z_{r,k}$$

In Equation 2, $r_k$ denotes a signal from which neighbor-cell interference has been canceled and that is received by a $k^{th}$ receiving end, $W_k$ denotes a whitening filter of the $k^{th}$ receiving end for canceling neighbor-cell interference, $H_k$ denotes a channel between a transmitting end and the $k^{th}$ receiving end, and $x_k$ denotes a signal precoded and transmitted to exclude multiuser interference among receiving ends within the same cell in the transmitting end. Also, $x_l$ denotes signals of other receiving ends precoded and transmitted to exclude interference among receiving ends within the same cell in the transmitting end, $H_{r,k}$ denotes a effective channel in which neighbor cell interference is canceled by $W_k$, and $z_k$ denotes a noise of the $k^{th}$ receiving end. Here, $z_{r,k}$ includes neighbor cell interference and a white noise.

As discussed with reference to Equation 2 above, the receiving ends 110, 120, and 130 cancel neighbor cell interference from received signals through a whitening filter.

Further, the receiving ends 110, 120, and 130 feed back channel information and neighbor cell interference information to the transmitting end 100 such that the transmitting end 100 can transmit a signal from which neighbor cell interference has been canceled.

The transmitting end 100 acquires feedback information from the receiving ends 110, 120, and 130 and selects target receiving ends using the feedback information. The following description of an exemplary implementation is based on the assumption that the transmitting end 100 selects the receiving end 1 110, the receiving end 2 120, and the receiving end 3 130 as the target receiving ends.

The transmitting end 100 simultaneously provides a service for the selected target receiving ends 110, 120 and 130 using spatial resources secured through a plurality of antennas. The transmitting end 100 transmits a signal taking into consideration interference between receiving ends within the same cell and neighbor cell interference through a Block Diagonalization (BD) technique based on the feedback information.

Figure 2:
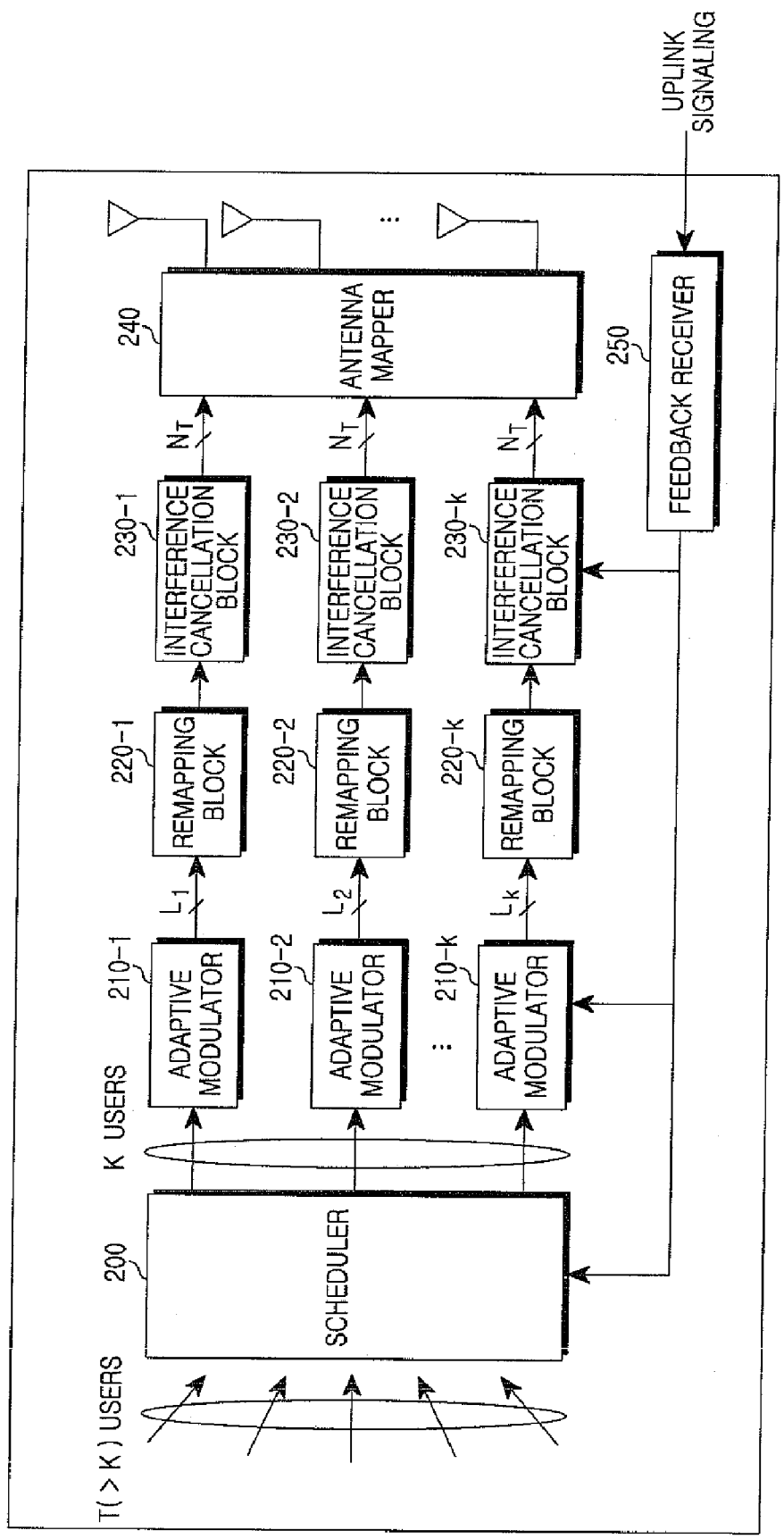
FIG. 2 is a block diagram illustrating the construction of a transmitting end in a multi-antenna system according to an exemplary embodiment of the present invention.

In order to cancel interference between receiving ends within the same cell and neighbor cell interference and in order to transmit a precoded signal, the transmitting end of the multi-antenna system according to an exemplary implementation has a construction as illustrated in FIG. 2 below.

FIG. 2 is a block diagram illustrating a construction of a transmitting end in a multi-antenna system according to an exemplary embodiment of the present invention.

As shown in FIG. 2, the transmitting end includes a scheduler 200, adaptive modulators 210-1 to 210-$k$, remapping blocks 220-1 to 220-$k$, interference cancellation blocks 230-1 to 230-$k$, an antenna mapper 240 and a feedback receiver 250.

The feedback receiver 250 identifies downlink channel state information and neighbor cell interference information of receiving ends using feedback signals that are received from the receiving ends located in a service area. That is, the receiving ends transmit the channel information and neighbor cell interference information of the transmitting end to the transmitting end via uplink feedback signal.

For example, the feedback receiver 250 identifies feedback signals of receiving ends through a Channel State and Quality Information (CSQI) that can be conveyed in an uplink sounding signal, an analog feedback signal, or a feedback bit. The CSQI may include Channel Quality Information (CQI) representing a Signal to Noise Ratio (SNR), Channel State Information (CSI), an SNR index, a channel capacity index, a codebook index, neighbor cell interference information, etc.

The scheduler 200 selects target receiving ends using channel information of receiving ends received from the feedback receiver 250. For example, the scheduler 200 selects K number of receiving ends having good channel states among the receiving ends located in the service area.

The adaptive modulators 210-1 to 210-$k$ adaptively modulate signals, which are to be transmitted to the receiving ends selected by the scheduler 200, depending on a channel state for each corresponding receiving end. For example, the first adaptive modulator 210-1 receives CSI of a first receiving end from the feedback receiver 250 and adaptively modulates a signal to be transmitted to the first receiving end depending on the received CSI. Also, a $K^{th}$ adaptive modulator 210-K receives CSI of a $K^{th}$ receiving end from the feedback receiver 250 and adaptively modulates a signal to be transmitted to the $K^{th}$ receiving end depending on the received CSI.

The remapping blocks 220-1 to 220-$k$ pre-compensate a signal received from the adaptive modulators 210-1 to 210-$k$ for distortion depending on a channel state of the received signal using channel state information of each corresponding receiving end received from the feedback receiver 250. The remapping blocks 220-1 to 220-$k$ are constructed taking into consideration the number of users selected in the scheduler 200 and the number of transmit antennas.

For example, each remapping block 220 may include a water filling unit and a Singular Value Decomposition (SVD) operation unit. As another example, each remapping block 220 may include a symbol remapping block and a pre-equalizer. When so configured, the symbol remapping block pre-compensates a transmitted signal received from the adaptive modulator 210 for channel distortion. That is, the symbol remapping block pre-compensates a transmitted signal for channel distortion and thus reduces power per transmitted symbol or a Peak to Average Power Ratio (PAPR). The symbol remapping block pre-compensates a transmitted signal for channel distortion using information (user indexes) of target receiving ends selected in the scheduler 200, a modulation level (an Adaptive Modulation and Coding (AMC) level index) of each of the receiving ends, and channel quality information (CQI) of the receiving ends received from the feedback receiver 250. In an exemplary implementation, the symbol remapping block that pre-compensates for channel distortion using vector perturbation may be constructed as shown in FIG. 3 below.

The pre-equalizer performs pre-equalization based on an inverse channel of each receiving end to reduce channel distortion of signals received from the symbol remapping block. The pre-equalizer performs pre-equalization using a Zero-Forcing (ZF) technique, a Minimum Mean Square Error (MMSE) technique, a Successive Interference Cancellation (SIC) technique, etc.

The interference cancellation blocks 230-1 to 230-$k$ respectively precode a signal received from the remapping blocks 220-1 to 220-$k$ to reduce interference between receiving ends located in the same cell and to reduce interference from a neighbor cell. For example, the interference cancellation blocks 230 precode a signal received from the remapping blocks 220 using a Block Diagonalization (BD) technique, to reduce interference between receiving ends located in the same cell and to reduce interference from a neighbor cell. Here, the interference cancellation blocks 230 perform BD using channel information that takes into consideration effective channel information and neighbor cell interference information of target receiving ends as in Equation 3 below:

$$\tilde{H}_k = [H_{r,1}^T, \ldots, H_{r,k-1}^T, H_{r,k+1}^T, \ldots, H_{r,K}^T]^T \quad (3)$$

In Equation 3, $\tilde{H}_k$ denotes a channel matrix with target receiving ends for performing BD and $H_{r,K}^T$ denotes a channel including neighbor cell interference information and effective channel information of a $K^{th}$ receiving end.

The interference cancellation blocks 230 perform SVD for a channel of Equation 3 and create a preceding factor for canceling multi-user interference among receiving ends within the same cell and neighbor-cell interference signals. Then, the interference cancellation blocks 230-1 to 230-$k$ precode a signal received from the remapping blocks 220-1 to 220-$k$ respectively, using the preceding factor.

The antenna mapper 240 maps signals received from the interference cancellation blocks 230-1, 230-2, and 230-$k$ to the multiple antennas and transmits the mapped signals to receiving ends.

As described above, the transmitting end removes multi-user interference among receiving ends within the same cell and cancels interference from a neighbor cell using the remapping blocks 220-1 to 220-$k$ and the interference cancellation blocks 230-1 to 230-$k$. In an exemplary embodiment, the transmitting end includes only the interference cancellation blocks 230 if vector perturbation is not used.

Figure 3A:
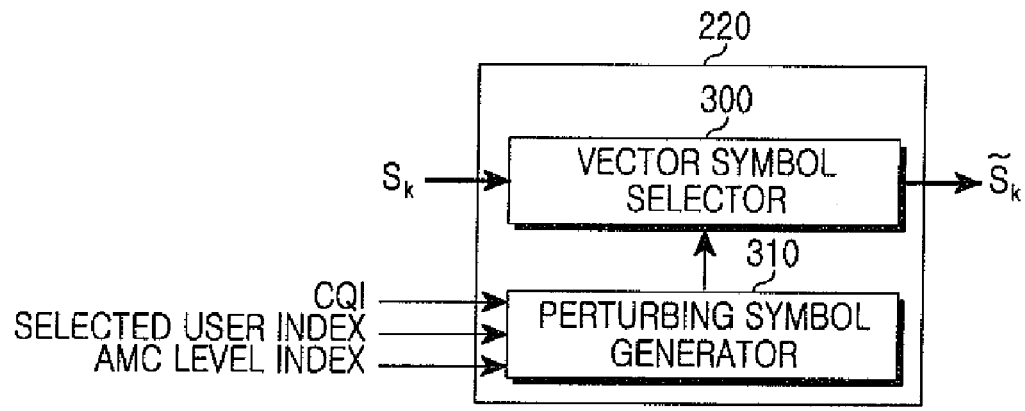
FIGS. 3A and 3B are detailed block diagrams illustrating constructions of remapping blocks of a transmitting end in a multi-antenna system according to an exemplary embodiment of the present invention.
Figure 3B:
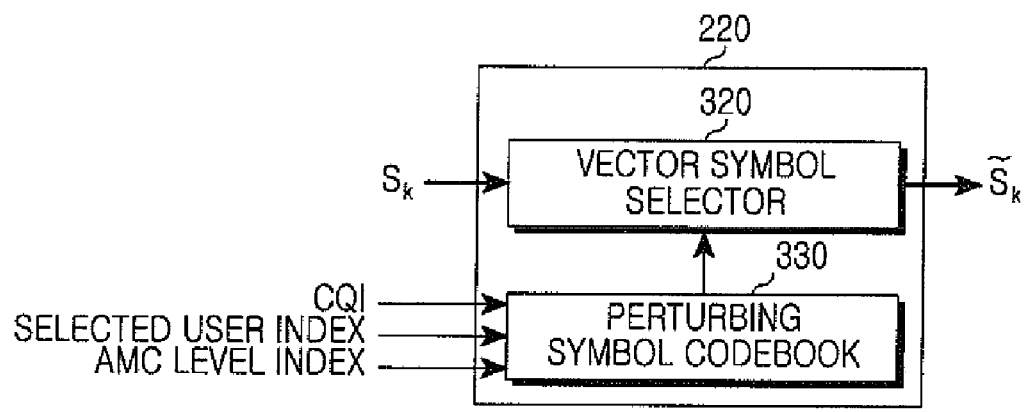

FIGS. 3A and 3B are detailed block diagrams illustrating constructions of remapping blocks of a transmitting end in a multi-antenna system according to exemplary embodiments of the present invention.

FIG. 3A shows a construction of an exemplary symbol remapping block 220 for generating a perturbing symbol and performing vector perturbation. FIG. 3B shows a construction of an exemplary symbol remapping block 220 for selecting a perturbing symbol based on a codebook and performing vector perturbation.

As shown in FIG. 3A, the symbol remapping block 220 includes a vector symbol selector 300 and a perturbing symbol generator 310.

The perturbing symbol generator 310 generates a perturbing symbol using information (user indexes) of target receiving ends selected in the scheduler 200, modulation levels (Adaptive Modulation and Coding (AMC) level indexes) of the receiving ends, and channel information (CQI) of the receiving ends. The perturbing symbol refers to a symbol obtained by converting a modulated symbol, which is received from the adaptive modulator 210, into a symbol for performing vector perturbation depending on a channel state. The perturbing symbol generator 310 can generate a perturbing symbol using a minimal transmission symbol power technique or a minimal PAPR technique.

The vector symbol selector 300 selects a perturbing signal that minimizes a size or power of a transmitted signal from among perturbing signals generated in the perturbing symbol generator 310. That is, the vector symbol selector 300 selects a perturbing symbol that minimizes a size or power of a transmitted signal when mapping a symbol of the transmitted signal to a perturbing symbol to pre-compensate the transmitted signal.

As shown in FIG. 3B, the symbol remapping block 220 includes a vector symbol selector 320 and a perturbing symbol codebook 330.

The perturbing symbol codebook 330 selects perturbing symbols, which accord to information (user indexes) of target receiving ends selected in the scheduler 200, modulation levels (AMC level indexes) of the receiving ends, and channel information (CQI) of the receiving ends, from a codebook. The perturbing symbol codebook 330 generates a codebook using a Grassmannian algorithm, a Given Rotation matrix or a Lloyd algorithm.

The vector symbol selector 320 selects a perturbing symbol that minimizes a size or power of a transmitted signal from among perturbing symbols selected in the perturbing symbol codebook 330.

Figure 4:
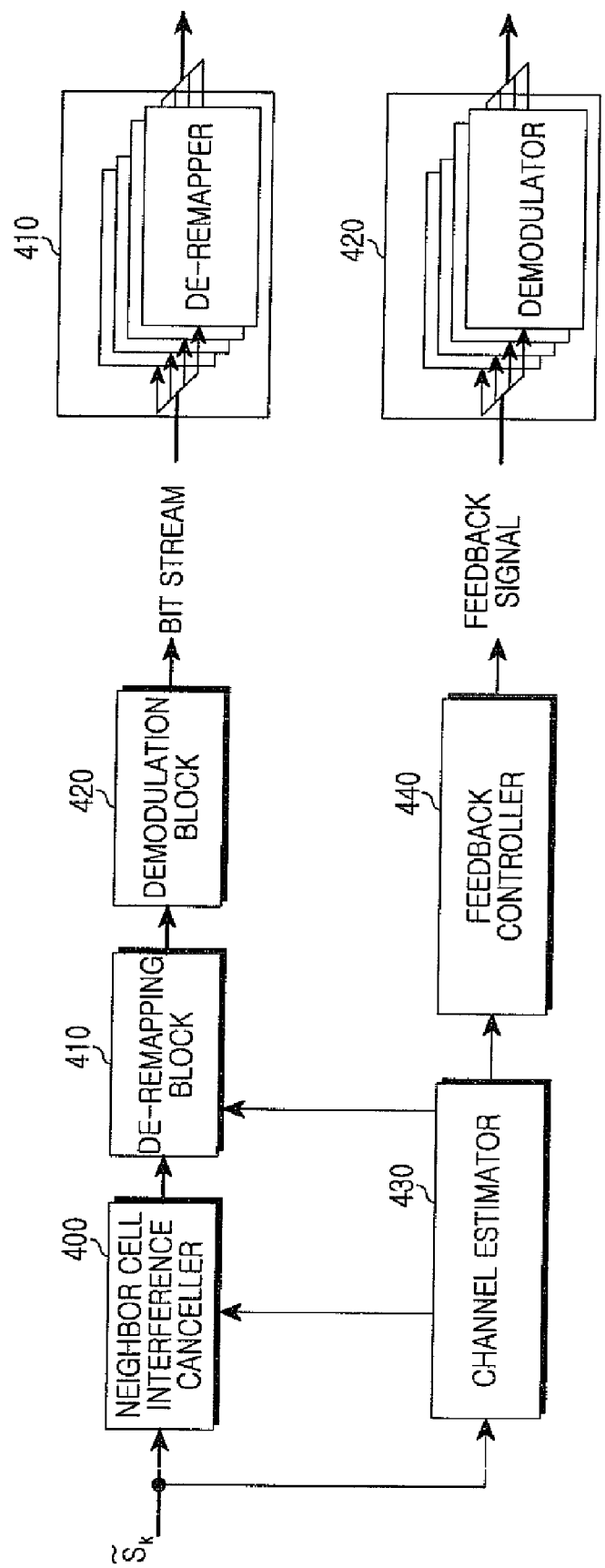
FIG. 4 is a block diagram illustrating a construction of a receiving end in a multi-antenna system according to an exemplary embodiment of the present invention.

An exemplary receiving end of a multi-antenna system for receiving a signal transmitted by a transmitting end has a construction as shown in FIG. 4 below.

FIG. 4 is a block diagram illustrating a construction of a receiving end in a multi-antenna system according to an exemplary embodiment of the present invention.

As shown in FIG. 4, the receiving end includes a neighbor-cell interference canceller 400, a de-remapping block 410, a demodulation block 420, a channel estimator 430, and a feedback controller 440.

The neighbor cell interference canceller 400 cancels adjacent-cell interference from a signal received through a receive antenna. For example, the neighbor cell interference canceller 400 cancels neighbor cell interference from a received signal using a whitening filter that uses neighbor cell interference information received from the channel estimator 430 as in Equation 2 above. The whitening filter ($W_k$) has a configuration as in Equation 4 below:

$$W_k = R_k^{\frac{-1}{2}} \qquad (4)$$

In Equation 4, $W_k$ represents a whitening filter of a $k^{th}$ receiving end and $R_k$ represents a neighbor cell interference of the $k^{th}$ receiving end.

As in Equation 4, the neighbor cell interference canceller 400 configures the whitening filter using an inverse function of neighbor cell interference.

The de-remapping block 410 converts symbols of a signal received from the neighbor cell interference canceller 400 into symbols before preceding in a transmitting end. As mentioned above, the transmitting end performs, by the remapping block 220, symbol remapping to pre-compensate symbols of a transmitted signal for distortion. Thus, the de-remapping block 410 converts symbols of received signals, which have been remapped in the transmitting end, into symbols before remapping. As further illustrated in FIG. 4, the de-remapping block 410 may include a plurality of de-remappers, each de-remapper corresponding to one of a plurality of transmitted signals received from a transmitting end and used to convert symbols of the respective signal.

In cases where the remapping block 220 of the transmitting end has performed remapping using a vector perturbation technique, the de-remapping block 410 has a construction as shown in FIG. 5 below.

The de-remapping block 410 operates only when the transmitting end performs remapping.

The demodulation block 420 demodulates a signal received from the de-remapping block 410 according to a corresponding modulation level. The demodulation block 420 performs demodulation at the same modulation level as a modulation level adaptively determined by the transmitting end depending on a channel state. As further illustrated in FIG. 4, the demodulation block 420 may include a plurality of demodulators, each demodulator corresponding to one of a plurality of transmitted signals received from a transmitting end and used to demodulate the respective signal.

The channel estimator 430 estimates a downlink channel with a transmitting end using the received signal. The channel estimator 430 estimates effective channel information and neighbor cell interference information of the transmitting end using a pilot signal included in the received signal. For example, the channel estimator 430 can process neighbor cell interference into a white noise using the central limit theorem. Thus, the channel estimator 430 can estimate the effective channel information and neighbor cell interference information of the transmitting end using the pilot signal included in the received signal.

The feedback controller 440 feeds back the effective channel information and neighbor cell interference information, which are estimated in the channel estimator 430, to the transmitting end in a form of an uplink sounding signal, an analog feedback, a CQI, and the like.

Figure 5A:
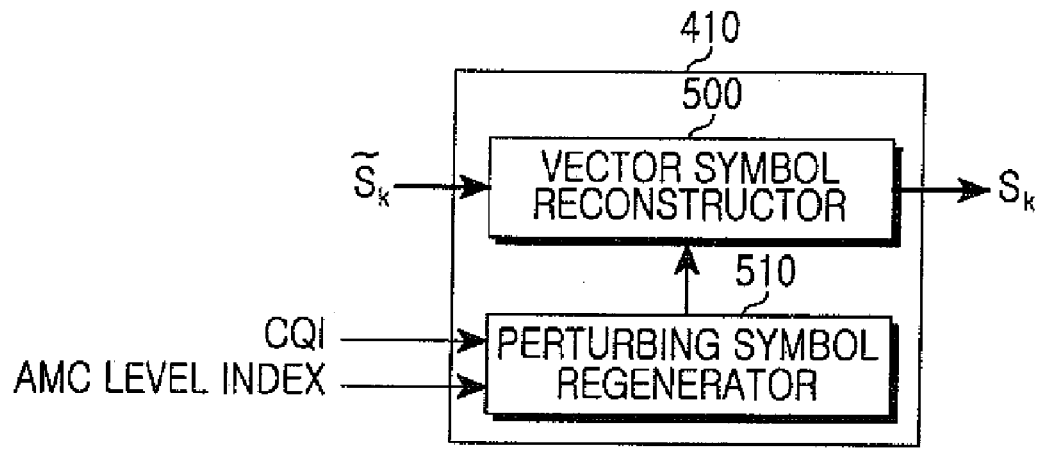
FIGS. 5A and 5B are detailed block diagrams illustrating constructions of de-remapping blocks of a receiving end in a multi-antenna system according to an exemplary embodiment of the present invention.
Figure 5B:
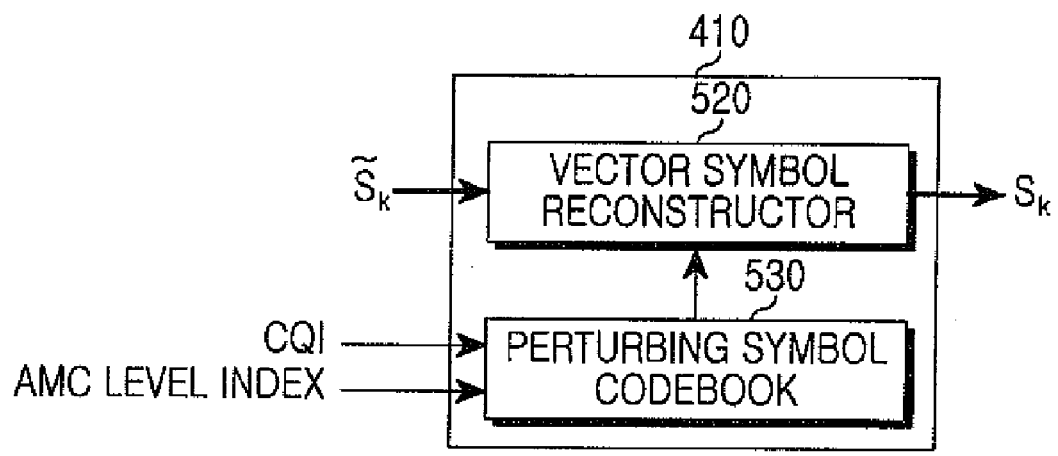

FIGS. 5A and 5B are detailed block diagrams illustrating constructions of de-remapping blocks of a receiving end in a multi-antenna system according to an exemplary embodiment of the present invention.

FIG. 5A shows a construction of a symbol de-remapping block 410 for reconstructing a perturbing symbol and performing symbol de-remapping. FIG. 5B shows a construction of a symbol de-remapping block 410 for selecting the perturbing symbol based on a codebook and performing symbol de-remapping.

As shown in FIG. 5A, the symbol de-remapping block 410 includes a vector symbol reconstructor 500 and a perturbing symbol regenerator 510.

The perturbing symbol regenerator 510 regenerates a perturbing symbol using a modulation level (an AMC level index) depending on a downlink channel state and downlink channel information (CQI). That is, the perturbing symbol regenerator 510 regenerates the same perturbing symbol as the perturbing symbol generator 310 of FIG. 3.

The vector symbol reconstructor 500 converts remapped symbols of received signals into symbols before remapping, using perturbing symbols regenerated in the perturbing symbol regenerator 510.

As shown in FIG. 5B, the symbol de-remapping block 410 includes a vector symbol regenerator 520 and a perturbing symbol codebook 530.

The perturbing symbol codebook 530 selects perturbing symbols, which accord to the modulation level (the AMC level index) depending on the downlink channel state and the downlink channel information (CQI), in a codebook. The perturbing symbol codebook 530 generates a codebook using a Grassmannian algorithm, a Given Rotation matrix or a Lloyd algorithm.

The vector symbol reconstructor 520 converts remapped symbols of received symbols into symbols before remapping, using the perturbing symbols selected in the perturbing symbol codebook 530.

An exemplary operation of a transmitting end and a receiving end that are constructed as discussed above are described below.

Figure 6:
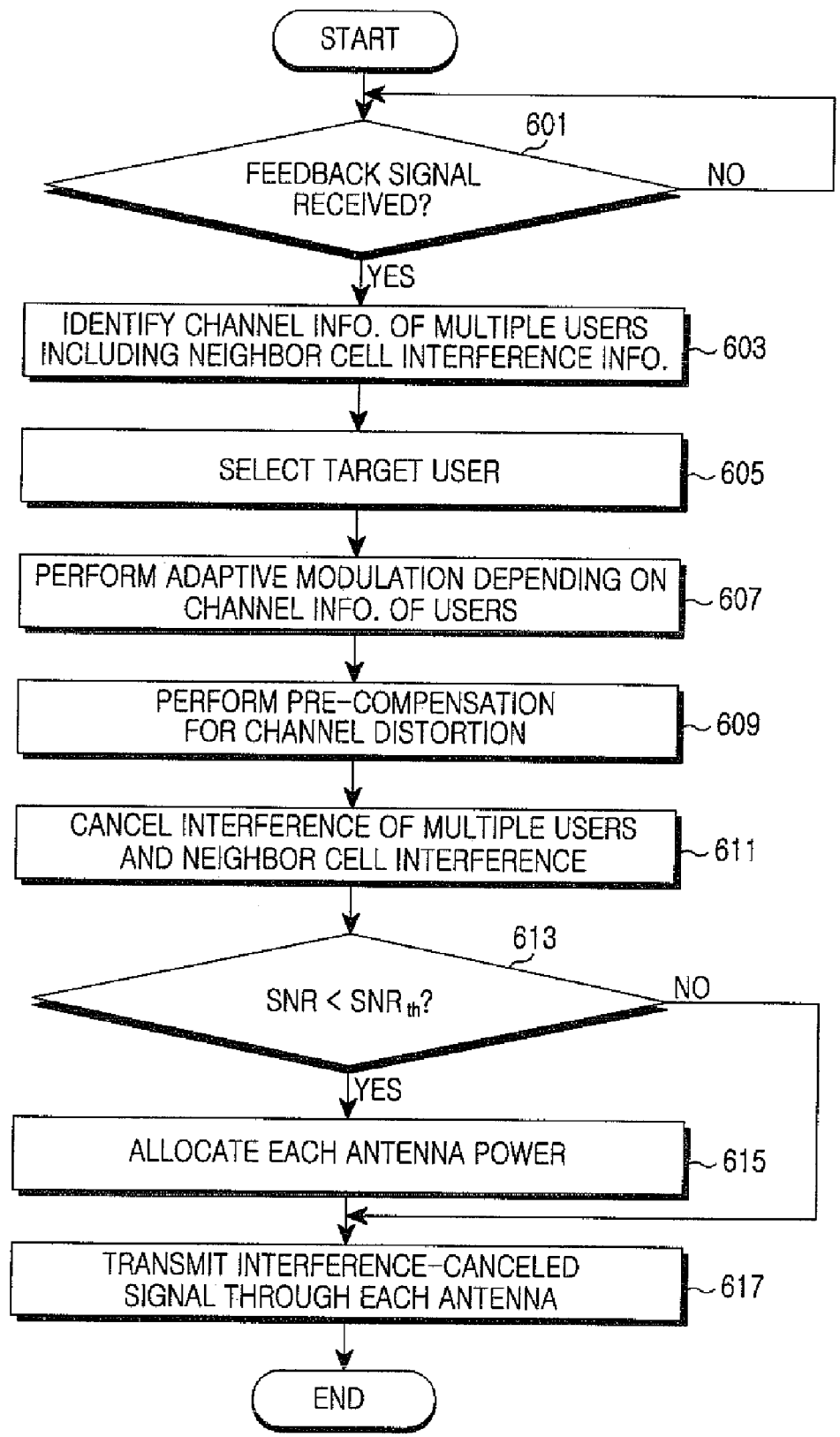
FIG. 6 is a flow diagram illustrating an operation process of a transmitting end in a multi-antenna system according to an exemplary embodiment of the present invention.

FIG. 6 is a flow diagram illustrating an operation process of a transmitting end in a multi-antenna system according to an exemplary embodiment of the present invention.

Referring to FIG. 6, the transmitting end identifies whether it receives a feedback signal from receiving ends located in a service area in step 601.

If the feedback signal is received, in step 603, the transmitting end identifies neighbor cell interference information of each of the receiving ends and downlink channel information of the receiving ends in the feedback signal.

Then, the transmitting end selects target receiving ends using the downlink channel information of the receiving ends in step 605.

After the target receiving ends are selected, the transmitting end determines a corresponding modulation level depending on the downlink channel information of the target receiving ends in step 607.

Then, the transmitting end adaptively modulates a signal to be transmitted to the receiving ends according to the determined modulation level of the receiving ends.

After the transmitted signal is adaptively modulated, the transmitting end pre-compensates signals to be transmitted to the receiving ends for channel distortion in step 609.

After pre-compensating the transmitted signals for the channel distortion, in step 611, the transmitting end precodes the pre-compensated transmitted signals in order to cancel the multi-user interference among multiple receiving ends and interference from neighbor cells. For example, the transmitting end precodes transmitted signals by performing BD using the fed back neighbor cell interference and downlink channel information of the receiving ends in order to cancel the interference between the multiple users and the neighbor cell interference.

After the transmitted signals are precoded, the transmitting end compares an SNR of a transmitted signal with a threshold value ($SNR_{th}$) in step 613.

If the SNR of the transmitted signal is larger than or equal to the threshold value ($SNR_{th}$), the transmitting end equally allocates transmission power of each transmit antenna and transmits a signal to each receiving end in step 617.

Alternatively, if the SNR is smaller than the threshold value ($SNR_{th}$), the transmitting end selects a transmit antenna for transmitting a signal to each receiving end in step 615. After that, the transmitting end determines transmission power of each transmit antenna, which is to transmit a signal, depending on a channel state of a receiving end.

After the transmission power of each transmit antenna to transmit the signal is allocated, the transmitting end transmits a signal through each transmit antenna using the determined transmission power in the step 617.

Then, the transmitting end terminates the process.

Figure 7:
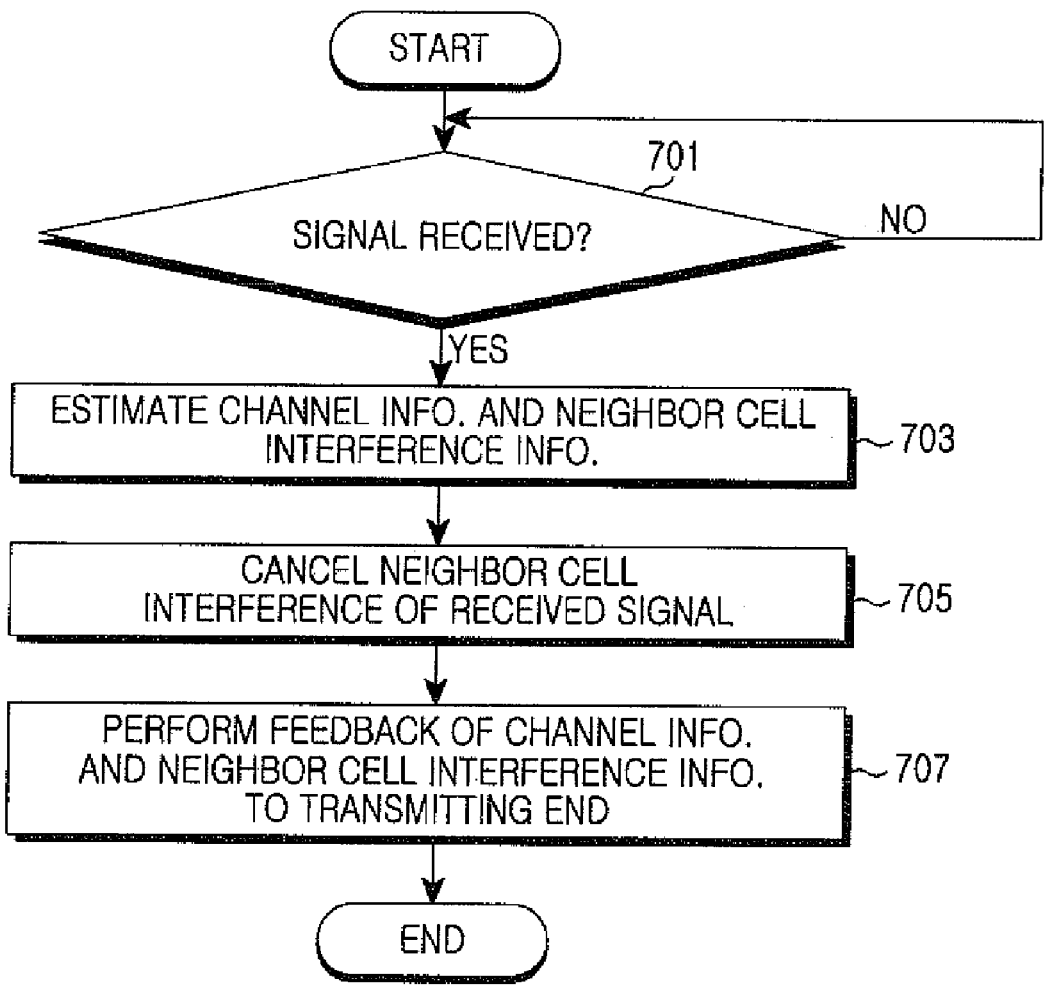
FIG. 7 is a flow diagram illustrating an operation process of a receiving end in a multi-antenna system according to an exemplary embodiment of the present invention.

FIG. 7 is a flow diagram illustrating an operation process of a receiving end in a multi-antenna system according to an exemplary embodiment of the present invention.

Referring to FIG. 7, the receiving end identifies if it receives a signal from the transmitting end in step 701.

If the signal is received, in step 703, the receiving end estimates effective channel information and neighbor cell interference information of the transmitting end using a pilot signal included in the received signal. For example, the receiving end can process neighbor cell interference into a white noise using the central limit theorem. Thus, the receiving end can estimate the effective channel state information and neighbor cell interference information of the transmitting end using the pilot signal.

Then, the receiving end cancels neighbor-cell interference included in the received signal using the neighbor cell interference information in step 705.

After the neighbor cell interference is canceled, the receiving end feeds back the effective channel information and neighbor cell interference information of the transmitting end to the transmitting end in step 707.

After that, the receiving end terminates the process.

In the above-described exemplary embodiment, the receiving end feeds back the effective channel information and neighbor cell interference information to the transmitting end after canceling the neighbor cell interference of the receiving end. In another exemplary embodiment, the receiving end may cancel neighbor cell interference after feeding back effective channel information and neighbor cell interference information to a transmitting end.

A description of performance variation in cases where a transmitting end of a multi antenna system transmits a signal taking into consideration the interference between receiving ends located in the same cell and interference from a neighbor cell is made below.

Figure 8:
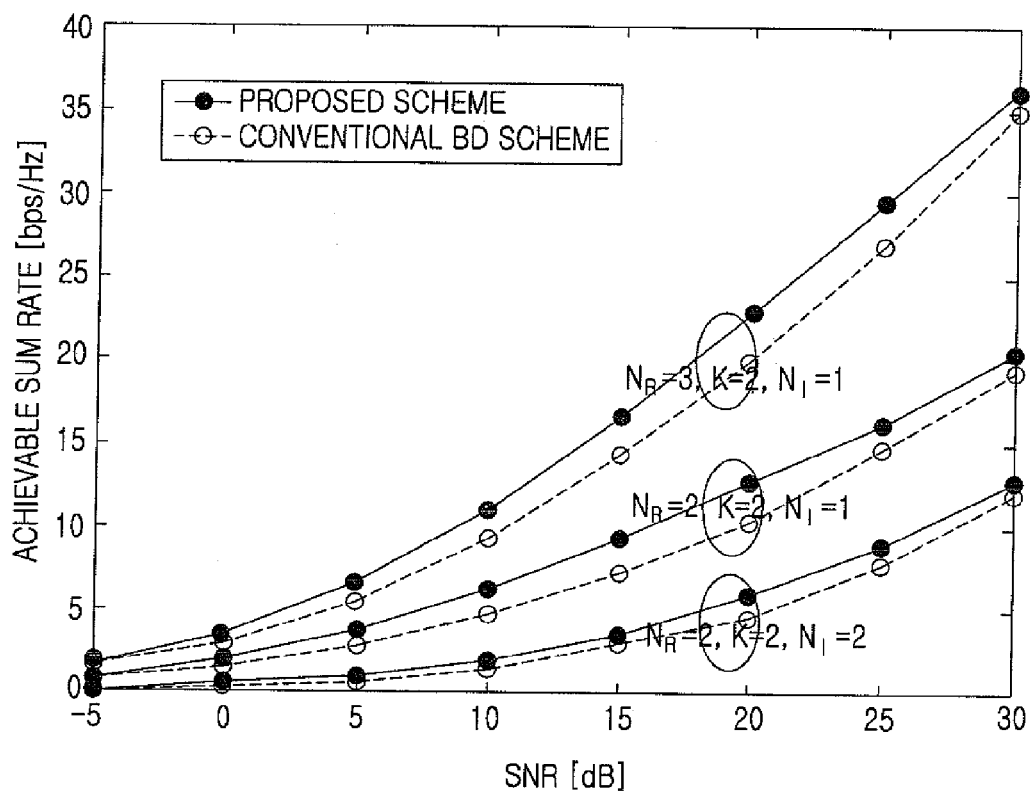
FIG. 8 is a graph of channel capacity according to an exemplary embodiment of the present invention.

FIG. 8 is a graph illustrating channel capacity according to an exemplary embodiment of the present invention. Here, a horizontal axis denotes an SNR and a vertical axis denotes an achievable sum rate. According to exemplary embodiments of the present invention, the SNR represents a Signal to Interference and Noise Ratio (SINR) because a receiving end processes neighbor cell interference into a white noise.

FIG. 8 shows a comparison of achievable sum rate to SNR between a proposed exemplary BD scheme of the present invention using effective channel information and neighbor cell interference information and a conventional BD scheme using effective channel information.

The multi-antenna system is assumed to have a constant Interference to Noise Ratio (INR) of about 20 dB.

In FIG. 8, the proposed BD scheme shows a higher achievable sum rate at the same SNR than the conventional BD scheme.

In FIG. 8, it is also illustrated that the sum rate achievable by the proposed BD scheme is reduced in cases where the multi-antenna system employs the same number of receiving ends and the same number of receive antennas for each receiving end.

Also, FIG. 8 illustrates that the proposed BD scheme shows a higher achievable sum rate as a greater number of receive antennas ($N_R$) are used in a receiving end of the multi-antenna system.

Figure 9:
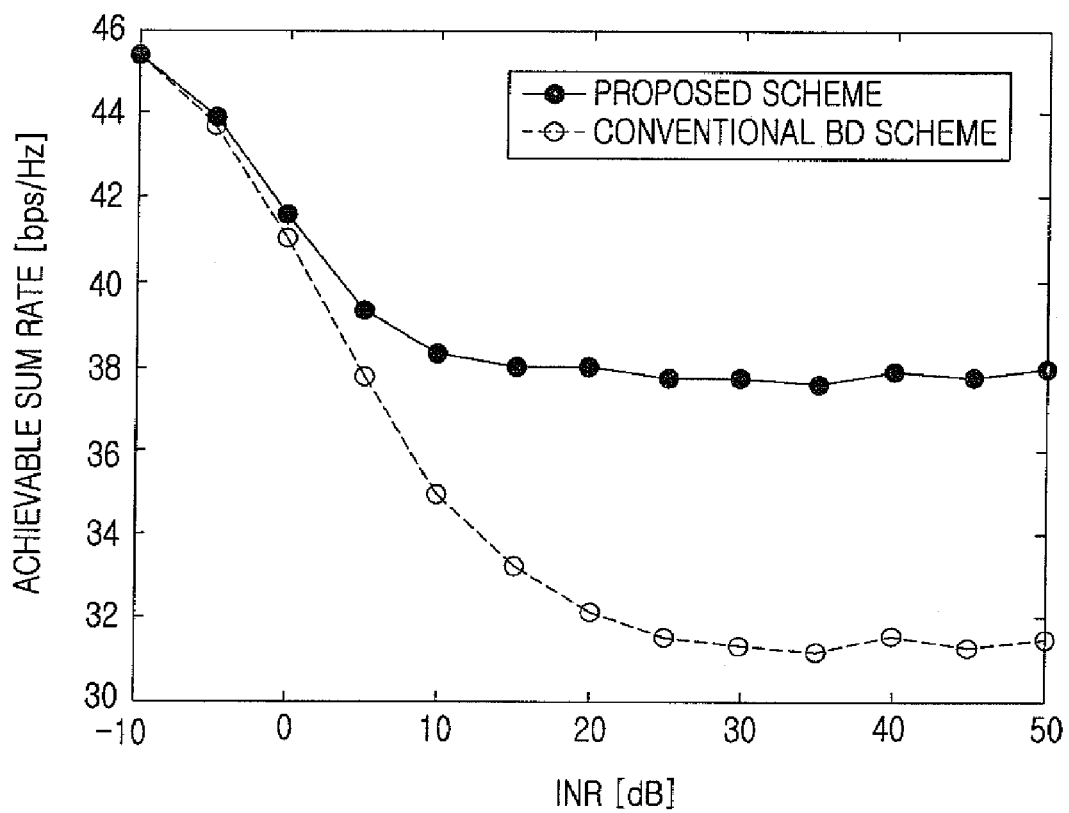
FIG. 9 is a graph of channel capacity according to another exemplary embodiment of the present invention.

FIG. 9 is a graph of channel capacity according to another exemplary embodiment of the present invention. Here, a horizontal axis denotes an INR and a vertical axis denotes an achievable sum rate.

FIG. 9 shows a comparison of achievable sum rate to INR between an exemplary BD scheme of the present invention using effective channel information and neighbor cell interference information and a conventional BD scheme using effective channel information.

For purposes of the comparison, the multi-antenna system is assumed to have a constant SNR of about 20 dB, have four receiving ends, and employ three receive antennas for each receiving end.

In FIG. 9, the proposed BD scheme shows a higher achievable sum rate at the same INR than the conventional BD scheme.

Figure 10:
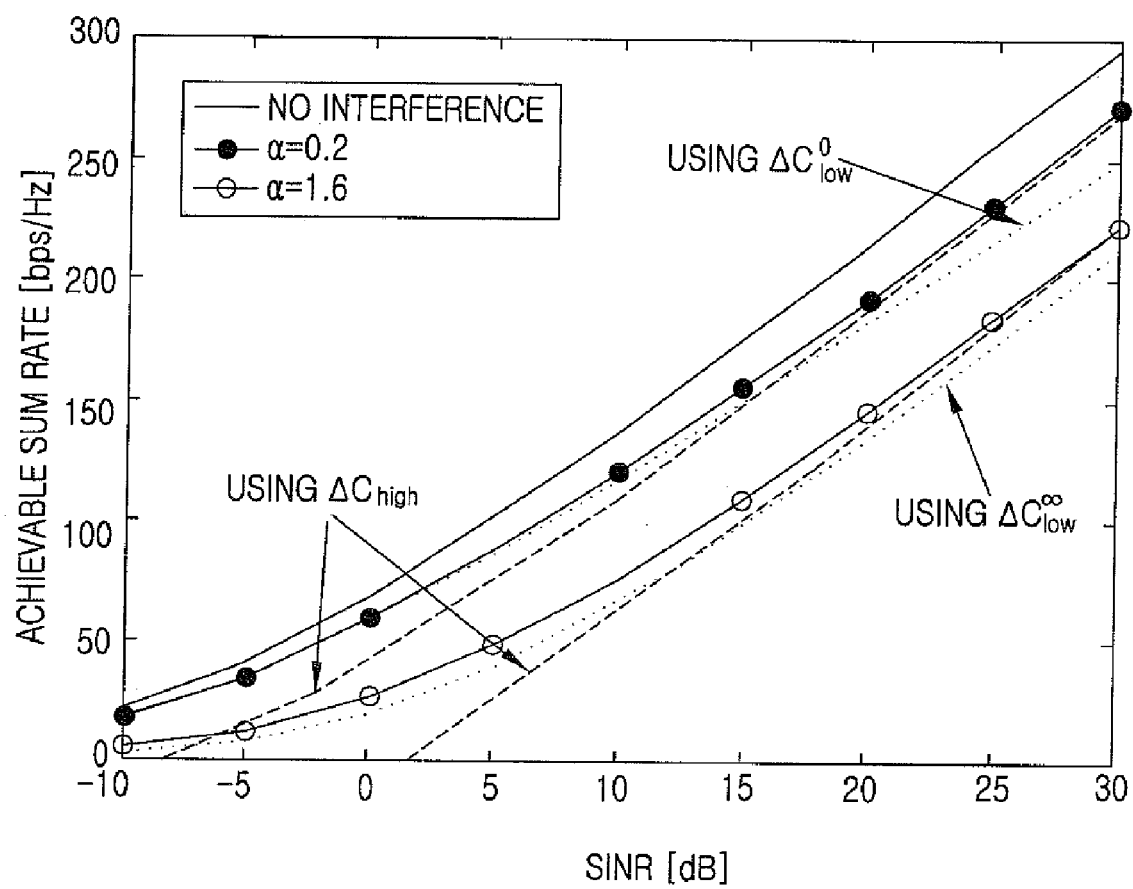
FIG. 10 is a graph of channel capacity according to a further another exemplary embodiment of the present invention.

FIG. 10 is a graph of channel capacity according to another exemplary embodiment of the present invention. Here, a horizontal axis denotes an SINR and a vertical axis denotes an achievable sum rate.

Referring to FIG. 10, an exemplary BD scheme of the present invention shows a maximal achievable sum rate if there is no neighbor cell interference. If there is neighbor cell interference, FIG. 10 illustrates that the achievable sum rate varies relative to a factor of '$\alpha$'. Here, '$\alpha$' represents a ratio of neighbor cell interference to the number of receive antennas used in the receiving end.

Thus, FIG. 10 illustrates that in the proposed BD scheme, the achievable sum rate is smaller as the neighbor cell interference increases and is larger as the number of receive antennas used in the receiving end increases.

As described above, exemplary embodiments of the present invention provide an advantage of canceling interference between users located in the same cell and interference from a neighbor cell and thus increase reception performance by transmitting a signal taking into consideration neighbor cell interference and interference between users located in the same cell in a multi-antenna system of a multi-cell multi-user environment.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus in a multi-antenna system, comprising:
   a receiver for receiving a signal using at least one antenna;
   a channel estimator for estimating effective channel information and neighbor cell interference information of a transmitting end using the received signal;
   a feedback controller for feeding back the effective channel information and neighbor cell interference information to the transmitting end;
   an interference canceller for canceling neighbor cell interference comprised in the received signal using the neighbor cell interference information received from the channel estimator; and
   a demodulator for demodulating the signal from which the neighbor cell interference has been canceled.

2. The apparatus of claim 1, wherein the channel estimator estimates the effective channel information and the neighbor cell interference information of the transmitting end using a pilot signal comprised in the received signal.

3. The apparatus of claim 1, further comprising:
   a symbol demapper for converting symbols, which are comprised in the signal received from the interference canceller, into symbols before precoding in a transmitting end for a pre-compensator to pre-compensate a transmitted signal for channel distortion, and transmitting the converted symbols to the demodulator.

4. A method for canceling interference in a receiving apparatus of a multi-antenna system, the method comprising:
   estimating effective channel information and neighbor cell interference information of a transmitting end using a signal received through at least one antenna;
   feeding back the effective channel information and neighbor cell interference information to the transmitting end;
   canceling neighbor cell interference comprised in the received signal using the estimated neighbor cell interference information; and
   demodulating the signal from which the neighbor cell interference has been canceled.

5. The method of claim 4, wherein the estimating of the effective channel information and neighbor cell interference information comprises:
   estimating the effective channel information and neighbor cell interference information of the transmitting end using a pilot signal comprised in the received signal.

6. The method of claim 4, further comprising:
   converting symbols, which are comprised in the signal from which the neighbor cell interference has been canceled, into symbols before precoding in a transmitting end for a pre-compensator to pre-compensate a transmitted signal for channel distortion, and
   demodulating the converted symbols.

* * * * *